US010180830B2

(12) United States Patent
Nakanoya

(10) Patent No.: US 10,180,830 B2
(45) Date of Patent: Jan. 15, 2019

(54) INFORMATION PROCESSING DEVICE, DEPLOYMENT METHOD, AND RECORDING MEDIUM

(71) Applicant: NEC Corporation, Minato-ku, Tokyo (JP)

(72) Inventor: Manabu Nakanoya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 222 days.

(21) Appl. No.: 15/315,439

(22) PCT Filed: Jun. 11, 2015

(86) PCT No.: PCT/JP2015/002937
§ 371 (c)(1),
(2) Date: Dec. 1, 2016

(87) PCT Pub. No.: WO2015/194139
PCT Pub. Date: Dec. 23, 2015

(65) Prior Publication Data
US 2017/0206070 A1 Jul. 20, 2017

(30) Foreign Application Priority Data
Jun. 17, 2014 (JP) .................... 2014-124444

(51) Int. Cl.
G06F 9/445 (2018.01)
G06F 8/60 (2018.01)
(Continued)

(52) U.S. Cl.
CPC .......... G06F 8/60 (2013.01); G06F 9/445 (2013.01); G06F 9/45558 (2013.01); G06F 9/46 (2013.01);
(Continued)

(58) Field of Classification Search
CPC ........................................... G06F 9/445
(Continued)

(56) References Cited

U.S. PATENT DOCUMENTS 9,223,601 B2 12/2015 Akiyama et al.
2001/0037212 A1* 11/2001 Motosuna ............. G06Q 10/10
705/1.1
(Continued)

FOREIGN PATENT DOCUMENTS

JP 2011-095871 A 5/2011
JP 2013-080275 A 5/2013
(Continued)

OTHER PUBLICATIONS

International Search Report for PCT Application No. PCT/JP2015/002937, dated Aug. 25, 2015.
(Continued)

Primary Examiner — Jae U Jeon

(57) ABSTRACT

Efficient system construction is enabled even when components (objects) of a system include such a setting item whose setting value is determined by an environment of a destination of construction during deployment. In a deployment device (100), a setting information storage unit (120) stores setting information indicating a referencing relation among setting items of a plurality of objects included in a system and a dependent item which is a setting item whose value is determined during deployment in an execution environment among the setting items of the plurality of objects. A deployment sequence determination unit (140) determines a sequence in which the plurality of objects are to be deployed in the execution environment, based on the setting information. A deployment execution unit (150) deploys each of the plurality of objects in the execution environment in accordance with the deployment sequence.

9 Claims, 14 Drawing Sheets

(51) Int. Cl.
  *G06F 9/46*    (2006.01)
  *G06F 9/50*    (2006.01)
  *G06F 9/455*   (2018.01)

(52) U.S. Cl.
  CPC ........ *G06F 9/50* (2013.01); *G06F 2009/4557* (2013.01)

(58) Field of Classification Search
  USPC .................................................. 717/174–178
  See application file for complete search history.

(56) References Cited

U.S. PATENT DOCUMENTS

| | | | |
|---|---|---|---|
| 2007/0294668 A1* | 12/2007 | Mohindra | G06F 8/36 717/120 |
| 2013/0086584 A1 | 4/2013 | Akiyama et al. | |
| 2015/0052509 A1* | 2/2015 | Wang | G06F 9/44526 717/168 |
| 2016/0062755 A1* | 3/2016 | Shimamura | G06F 8/61 717/177 |

FOREIGN PATENT DOCUMENTS

| | | |
|---|---|---|
| WO | 2013/042618 A1 | 3/2013 |
| WO | 2013/183249 A1 | 12/2013 |

OTHER PUBLICATIONS

English translation of Written opinion for PCT Application No. PCT/JP2015/002937.

\* cited by examiner

INFORMATION PROCESSING DEVICE, DEPLOYMENT METHOD, AND RECORDING MEDIUM

This application is a National Stage Entry of PCT/JP2015/002937 filed on Jun. 11, 2015, which claims priority from Japanese Patent Application 2014-124444 filed on Jun. 17, 2014, the contents of all of which are incorporated herein by reference, in their entirety.

TECHNICAL FIELD

The present invention relates to an information processing device, a deployment method, and a recording medium.

BACKGROUND ART

A user of an information technology (IT) service, such as a cloud infrastructure, constructs an information system to be operated on the service by deploying components, such as virtual machines (VMs) constituting the system, in a service environment. The user converts various settings relating to the system into a group of parameters conforming to specifications of the service environment, and applies the group of parameters.

However, the group of parameters includes pieces of information, such as an internal control identifier (ID), a global internet protocol (IP) address, and a security key for VMs, which are sequentially determined by a service environment during deployment of VMs and which are unable to be determined in advance by a user. Such information to be determined (paid out) by a service environment is usually provided to a user from the service environment, and the user is required to reflect the information to settings of a system. The user reflects the information to the system by manually inserting these pieces of information to the settings when deploying VMs, or by manually changing the settings after deployment of VMs. This may cause setting inconsistency among the VMs and an increase in an operational load associated with an individual setting work.

For example, PTL 1 discloses a technique for ensuring such setting consistency and reducing an operational load in system construction.

A setting control device described in PTL 1 determines, in deploying a system including a plurality of virtual servers, a sequence in which the virtual servers are to be deployed based on setting dependency among pieces of software on the virtual servers.

In addition, PTL 2 discloses, as a related art, a program distribution method whereby, in deploying an application program, a setting value such as a host name and an IP address is set corresponding to a virtual machine selected as a destination of deployment of the application program.

CITATION LIST

Patent Literature

[PTL 1] Japanese Patent Application Laid-Open Publication No. 2013-080275
[PTL 2] Japanese Patent Application Laid-Open Publication No. 2011-095871

SUMMARY OF INVENTION

Technical Problem

The setting control device described in PTL 1 determines, in a state where setting values for each virtual server included in a system are determined, a sequence in which the virtual servers are to be deployed, in accordance with a dependence relation among the virtual servers. Consequently, the technique described in PTL 1 is not applicable to such a system in which, as described above, settings for each of VMs are dependent on an environment of a destination of deployment and are determined during deployment.

An object of the present invention is to provide an information processing device, a deployment method, and a recording medium which solve the above-described problem and enable efficient system construction even when components of a system include such a setting item whose setting value is determined by an environment of a destination of construction during deployment.

Solution to Problem

An information processing device according to an exemplary aspect of the invention includes: setting information storage means for storing setting information indicating a referencing relation among setting items of a plurality of objects included in a system and a dependent item which is a setting item whose value is determined during deployment in an execution environment among the setting items of the plurality of objects, deployment sequence determination means for determining a sequence in which the plurality of objects are to be deployed in the execution environment, based on the setting information; and deployment execution means for deploying each of the plurality of objects in the execution environment in accordance with the deployment sequence.

A deployment method according to an exemplary aspect of the invention includes: determining, based on setting information indicating a referencing relation among setting items of a plurality of objects included in a system and a dependent item which is a setting item whose value is determined during deployment in an execution environment among the setting items of the plurality of objects, a sequence in which the plurality of objects are to be deployed in the execution environment; and deploying each of the plurality of objects in the execution environment in accordance with the deployment sequence.

A computer readable storage medium according to an exemplary aspect of the invention records thereon a program, causing a computer to perform a method including: determining, based on setting information indicating a referencing relation among setting items of a plurality of objects included in a system and a dependent item which is a setting item whose value is determined during deployment in an execution environment among the setting items of the plurality of objects, a sequence in which the plurality of objects are to be deployed in the execution environment; and deploying each of the plurality of objects in the execution environment in accordance with the deployment sequence.

Advantageous Effects of Invention

An advantageous effect of the present invention is to enable efficient system construction even when components of a system include such a setting item whose setting value is determined by an environment of a destination of construction during deployment.

DESCRIPTION OF EMBODIMENTS

First Exemplary Embodiment

A first exemplary embodiment of the present invention will be described.

First, description is given about a computer system (hereinafter, simply referred to as a "system") to be constructed according to the first exemplary embodiment of the present invention, and setting information 121.

The system according to the first exemplary embodiment of the present invention includes a plurality of functional objects (hereinafter, simply referred to as "objects"). The objects are, for example, servers (virtual servers), virtual routers, virtual storages and the like on virtual machines (VMs). The objects are deployed on an execution environment 300 by using a resource such as a computer 320, a network device, and a storage device of the execution environment 300.

In deployment of each of objects, a setting value for one or more setting items relating to a function to be achieved by the object is applied. For example, in deployment of virtual servers, the number of central processing units (CPU) of VMs and the memory size thereof are applied as setting items.

In the first exemplary embodiment of the present invention, the setting information 121 is defined, which is obtained by grouping one or more sets of such a setting item necessary for deploying each of objects included in a system and such a setting value (a piece of information relating to the setting item).

Figure 9:
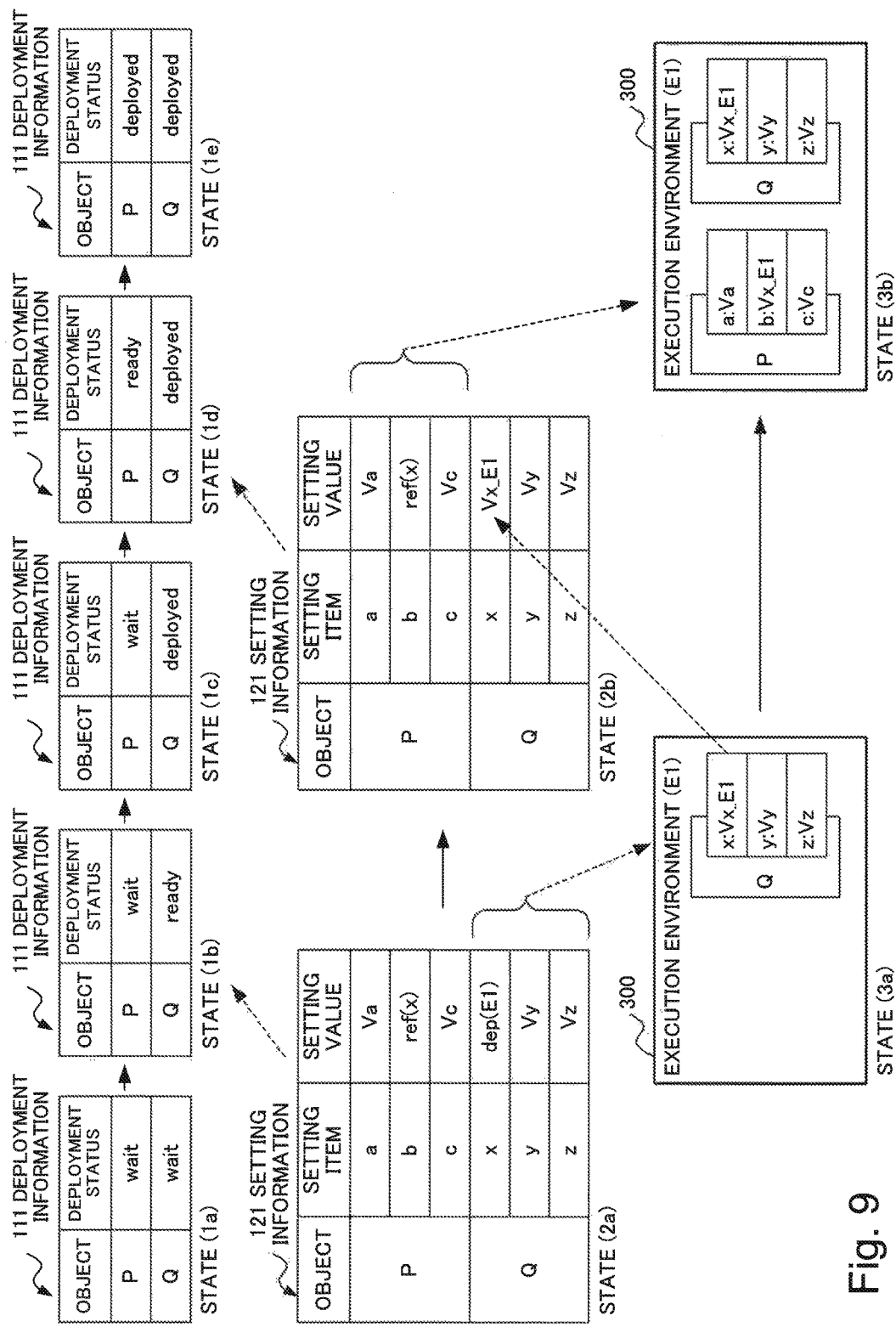
FIG. 9 is a diagram illustrating an example of states of deployment information 111, setting information 121, and an execution environment 300 according to the first exemplary embodiment of the present invention.

FIG. 9 is a diagram illustrating an example of states of deployment information 111, the setting information 121, and the execution environment 300 according to the first exemplary embodiment of the present invention.

In the example in FIG. 9, the setting information 121 includes, for each identifier of an object, sets of an identifier of setting item included in the object and a setting value for the setting item. For example, the setting information 121 (state (2a)) in FIG. 9 indicates that an object "P" includes "a:Va", "b:ref(x)", and "c:Vc" as sets of a setting item and a setting value. In addition, the setting information 121 (state (2a)) in FIG. 9 indicates that an object "Q" includes "x:dep (E1)", "y:Vy", and "z:Vz".

In this manner, as a setting value for each of setting items (a piece of information relating to each of setting items) in the setting information 121, "dep( )" and "ref( )", which are values representing a property of a setting item, are used, in addition to specific values applied during deployment, such as a numerical value and a character string.

The setting value "dep( )" herein indicates that the setting item is a dependent item on the execution environment 300 indicated within ( ). The dependent item refers to a setting item whose setting value is determined by the execution environment 300 when an object is deployed in the execution environment 300. For example, when virtual servers are deployed on a public cloud environment, a global IP address reachable from a public network such as the Internet may be sometimes allocated by the public cloud environment. In this case, the global IP address is a dependent item.

For example, in the setting information 121 (state (2a)) in FIG. 9, a setting item "x" of the object "Q" is a dependent item. A setting value for the setting item "x" is determined by the execution environment 300 "E1" during deployment of the object "Q".

In addition, the setting value "ref( )" indicates that the setting item is a referencing item which uses another setting item indicated within 0 as a reference destination. The referencing item refers to a setting item whose setting value uses the same value as a setting value for a setting item at a reference destination. For example, when there is an application server accessing a database server, it is necessary that an IP address and a port number of a database at a destination of connection of the application server match with an IP address and a waiting port number of the database server. In this case, the IP address and the port number of the database at a destination of connection of the application server are setting items which use the IP address and the waiting port number of the database server as reference destinations.

For example, in the setting information 121 (state (2a)) in FIG. 9, a setting item "b" of the object "P" is a referencing item. A setting value for the setting item "b" uses the setting value for the setting item "x" of the object "Q".

In the first exemplary embodiment of the present invention, such properties of setting items (dependent item, referencing item) are used to determine a sequence in which each of objects is to be deployed on the execution environment 300 of a destination of system construction. Herein, when requesting the execution environment 300 for deployment of objects, it is assumed that it is necessary to designate setting values for respective setting items other than a dependent item. In this case, for example, when a setting item "a" of an object "A" is a referencing item which uses a setting item "b" of another object "B" as a reference destination and the setting item "b" is a dependent item, the setting value for the setting item "a" is not determined until the object "B" is deployed. Thus, a sequence is determined in such a way that the object "A" is to be deployed later than the object "B".

Figure 2:
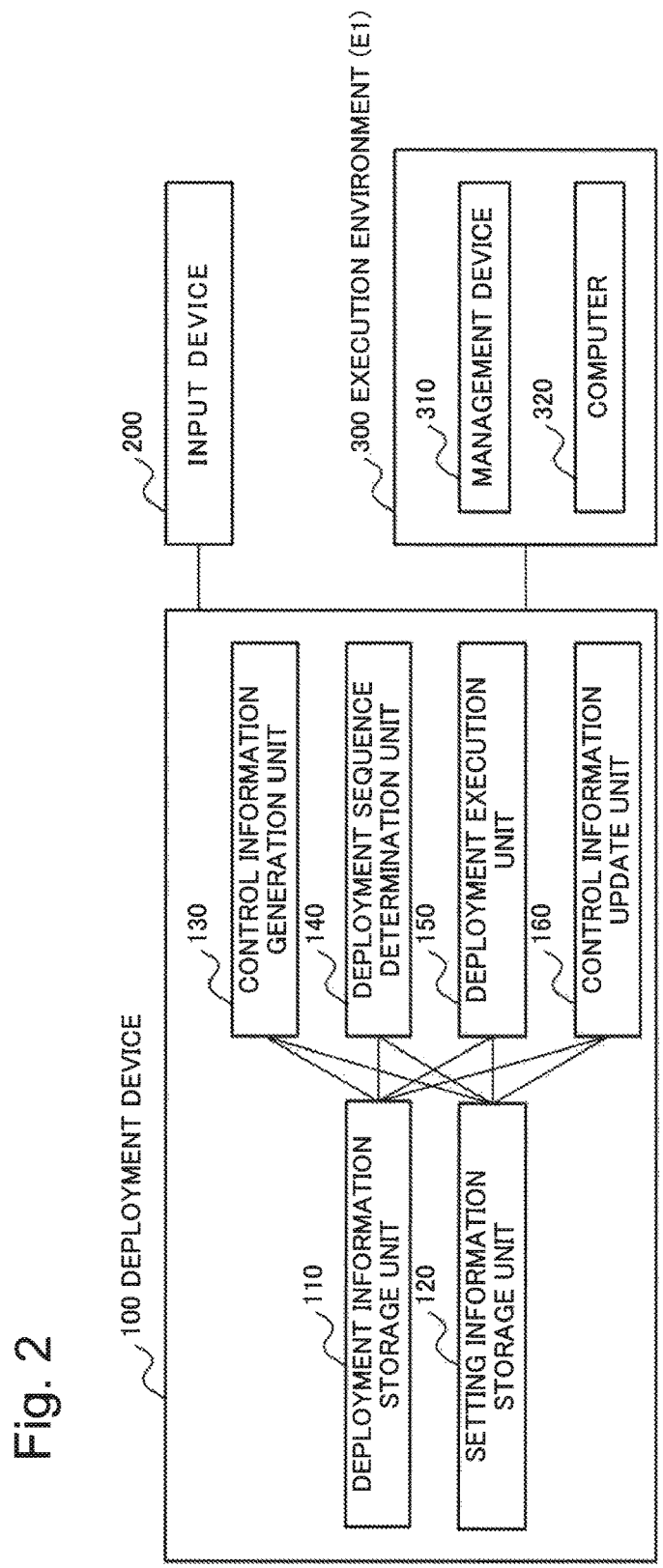
FIG. 2 is a block diagram illustrating a configuration of a deployment system according to the first exemplary embodiment of the present invention.

Next, a configuration according to the first exemplary embodiment of the present invention will be described. FIG. 2 is a block diagram illustrating a configuration of a deployment system according to the first exemplary embodiment of the present invention.

Referring to FIG. 2, the deployment system according to the first exemplary embodiment of the present invention includes a deployment device 100, an input device 200, and an execution environment 300. The deployment device 100 is an exemplary embodiment of an information processing device according to the present invention.

The deployment device 100 is connected with the input device 200 via a local area network (LAN) or the like. In addition, the deployment device 100 is connected with the execution environment 300 via a network such as the Internet, a LAN, and a wide area network (WAN). The execution environment 300 herein is, for example, a cloud environment which provides a cloud where a system is constructed, such as a public cloud and a private cloud. The input device 200 accepts a system construction request from a user, and transmits the system construction request to the deployment device 100. The deployment device 100 requests the execution environment 300 to deploy objects included in a system.

The deployment device 100 includes a deployment information storage unit 110, a setting information storage unit 120, a control information generation unit (or setting information generation unit) 130, a deployment sequence determination unit 140, a deployment execution unit 150, and a control information update unit 160.

The deployment information storage unit 110 stores deployment information 111. The deployment information 111 indicates a deployment status of each of objects.

In the example in FIG. 9, the deployment information 111 includes, for each identifier of an object, a deployment status of the object. As the deployment status, "wait (waiting for deployment)", "ready (deployable)", and "deployed (already deployed)" are used.

The setting information storage unit 120 stores the setting information 121 described above.

Note that, in the first exemplary embodiment of the present invention, the deployment information 111 and the setting information 121 are collectively referred to as control information.

The control information generation unit 130 generates the control information (the deployment information 111 and the setting information 121).

The deployment sequence determination unit 140 determines a sequence in which objects are to be deployed in the execution environment 300, based on the control information. The deployment sequence determination unit 140 herein extracts deployable objects by using the control information.

The deployment execution unit 150 requests the execution environment 300 to deploy objects in accordance with the determined deployment sequence. The deployment execution unit 150 herein requests for deploying the deployable objects extracted by the deployment sequence determination unit 140.

The control information update unit 160 updates the control information in accordance with a result of the deployment.

The execution environment 300 includes a management device 310, and, as a resource, one or more computers 320. In addition, the execution environment 300 may include, as a resource, a network device and a storage device.

Note that the deployment device 100 may be a computer which includes a CPU and a storage medium storing a program and which operates under control based on the program.

Figure 3:
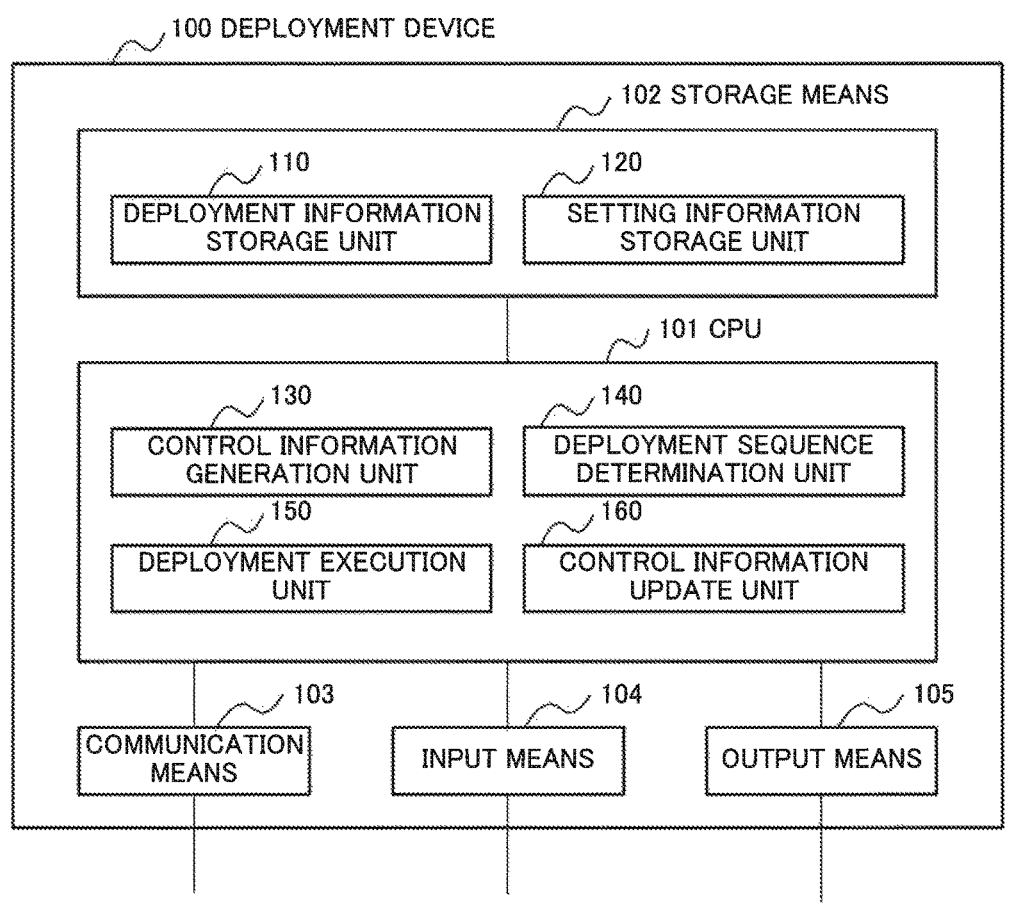
FIG. 3 is a block diagram illustrating a configuration of a deployment device 100 implemented by a computer according to the first exemplary embodiment of the present invention.

FIG. 3 is a block diagram illustrating a configuration of the deployment device 100 implemented by a computer according to the first exemplary embodiment of the present invention. The deployment device 100 includes a CPU 101, a storage means (storage medium) 102 such as a hard disk and a memory, a communication means 103 for performing data communication with other devices and the like, an input means 104 such as a keyboard, and an output means 105 such as a display.

The CPU 101 executes a computer program for achieving functions of the control information generation unit 130, the deployment sequence determination unit 140, the deployment execution unit 150, and the control information update unit 160. The storage means 102 stores pieces of data of the deployment information storage unit 110 and the setting information storage unit 120. In addition, the deployment information storage unit 110 and the setting information storage unit 120 may be configured as separate storage media, or as a single storage medium. The communication means 103 receives a system construction request from the input device 200, and transmits a deployment request to the execution environment 300. In addition, the input means 104 may accept a system construction request from a user, or the output means 105 may output a result of system construction and a result of deployment of each of objects.

In addition, each of the components of the deployment device 100 illustrated in FIG. 2 may be an independent logic circuitry.

Next, the operation of the deployment system according to the first exemplary embodiment of the present invention will be described.

Figure 4:
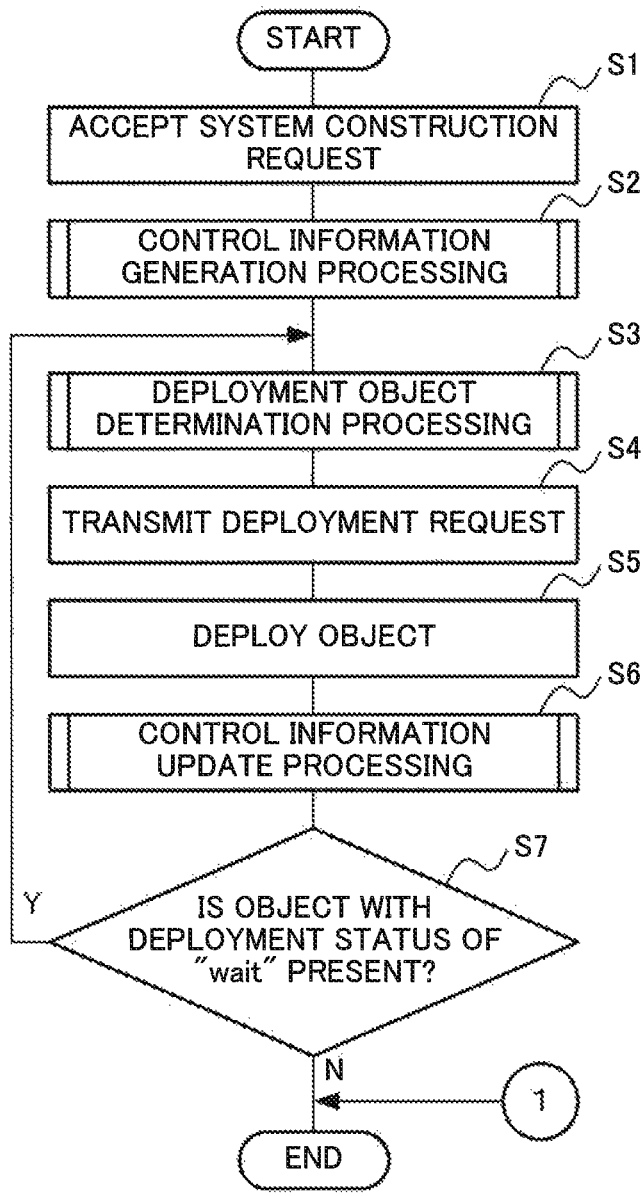
FIG. 4 is a flowchart illustrating overall processing of the deployment system according to the first exemplary embodiment of the present invention.

FIG. 4 is a flowchart illustrating overall processing of the deployment system according to the first exemplary embodiment of the present invention.

The input device 200 accepts a system construction request from a user, and transmits the system construction request to the deployment device 100 (Step S1). The system construction request herein includes the setting information 121 and an identifier of the execution environment 300 which is a destination of system construction.

For example, the input device 200 transmits, to the deployment device 100, a system construction request which includes the setting information 121 (state (2a)) in FIG. 9 and an identifier "E1" of the execution environment 300.

The control information generation unit 130 of the deployment device 100 executes control information generation processing (Step S2).

Figure 5:
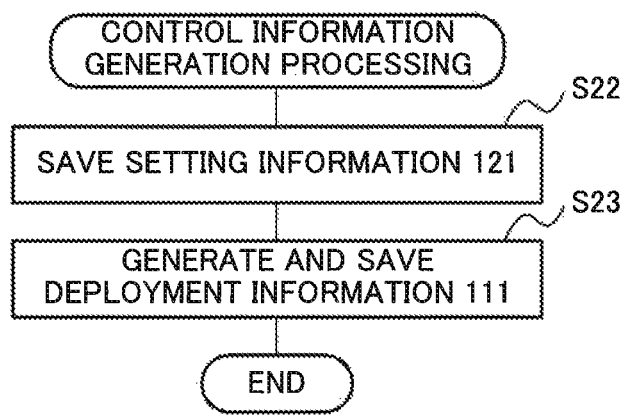
FIG. 5 is a flowchart illustrating a detail of control information generation processing (Step S2) according to the first exemplary embodiment of the present invention.

FIG. 5 is a flowchart illustrating a detail of the control information generation processing (Step S2) according to the first exemplary embodiment of the present invention.

The control information generation unit 130 saves the setting information 121 received from the input device 200 in the setting information storage unit 120 (Step S22).

For example, the control information generation unit 130 saves the setting information 121 (state (2a)) in FIG. 9.

The control information generation unit 130 generates, based on the setting information 121, the deployment information 111, and saves the generated deployment information 111 in the deployment information storage unit 110 (Step S23). The control information generation unit 130 herein generates the deployment information 111 in which "wait" is set to a deployment status of each of objects included in the setting information 121.

For example, the control information generation unit 130 generates and saves the deployment information 111 (state (1a)) in FIG. 9.

Next, the deployment sequence determination unit 140 executes deployment object determination processing (Step S3).

Figure 6:
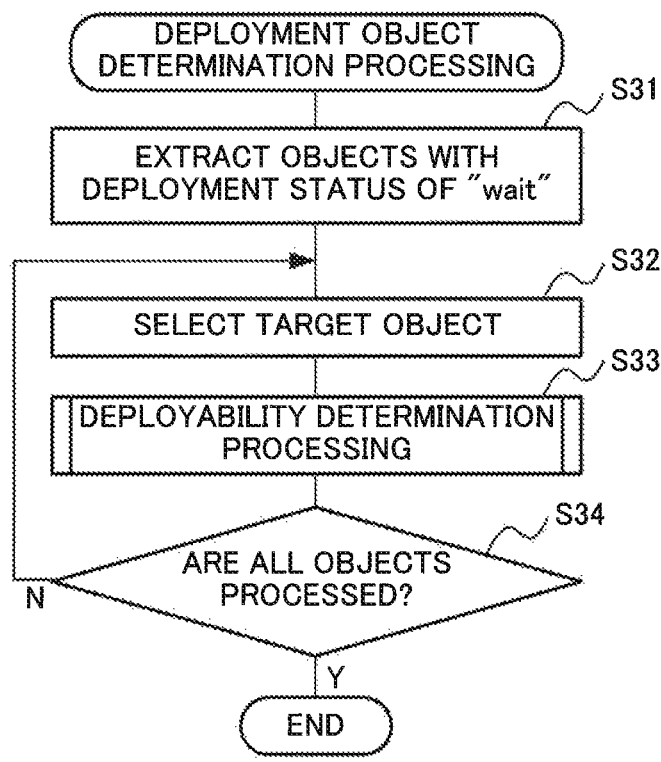
FIG. 6 is a flowchart illustrating a detail of deployment object determination processing (Step S3) according to the first exemplary embodiment of the present invention.

FIG. 6 is a flowchart illustrating a detail of the deployment object determination processing (Step S3) according to the first exemplary embodiment of the present invention.

The deployment sequence determination unit 140 extracts objects with a deployment status of "wait" from the deployment information 111 (Step S31).

The deployment sequence determination unit 140 selects one (target object) of the extracted objects (Step S32).

The deployment sequence determination unit 140 executes deployability determination processing on the target object (Step S33).

Figure 7:
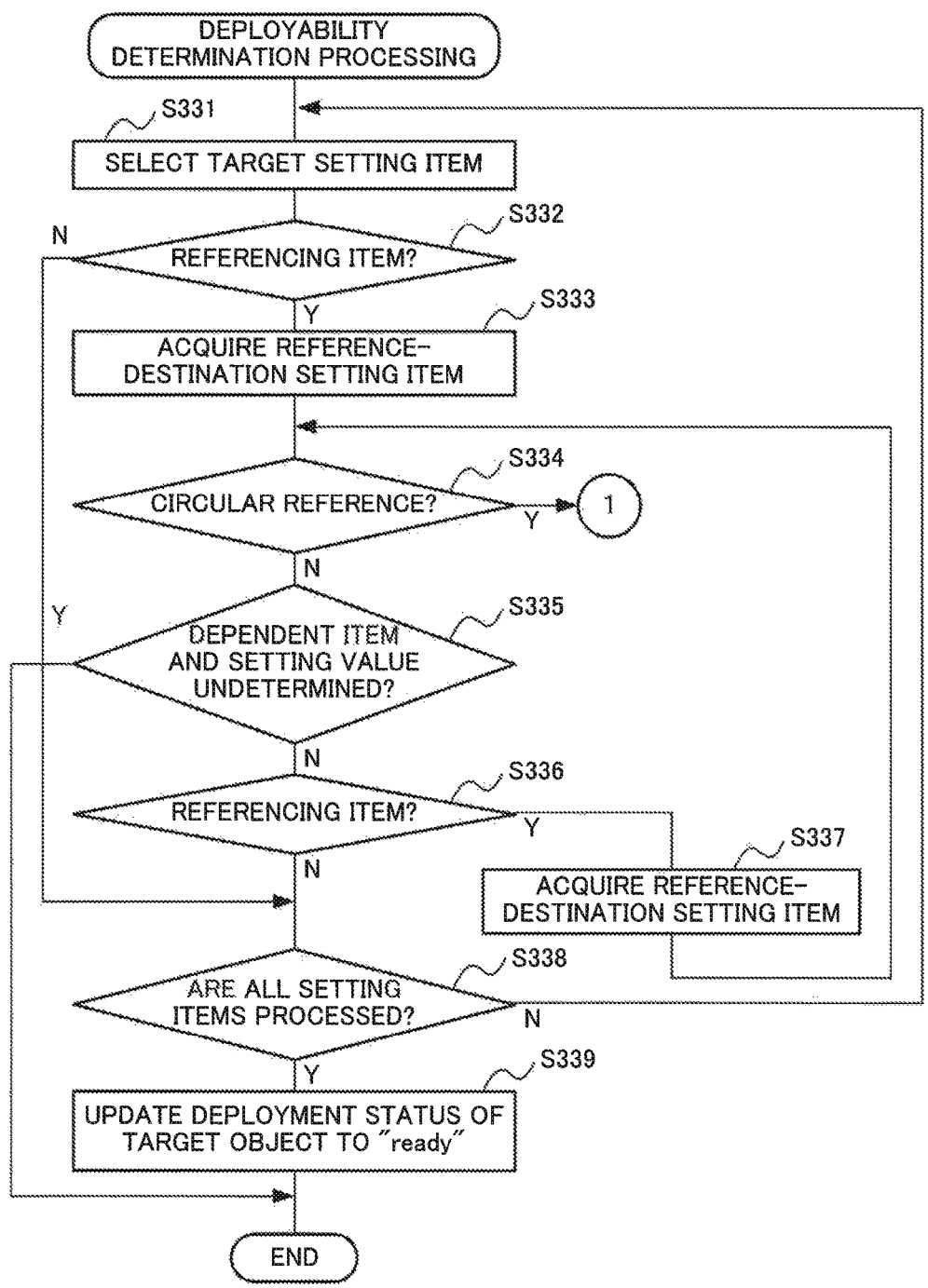
FIG. 7 is a flowchart illustrating a detail of deployability determination processing (Step S33) according to the first exemplary embodiment of the present invention.

FIG. 7 is a flowchart illustrating a detail of the deployability determination processing (Step S33) according to the first exemplary embodiment of the present invention.

The deployment sequence determination unit 140 selects one (target setting item) of setting items of the target object (Step S331).

The deployment sequence determination unit 140 determines whether the target setting item is a referencing item (Step S332).

When the target setting item is a referencing item at Step S332 (Step S332/Y), the deployment sequence determination unit 140 acquires, from the setting information 121, a setting item at a reference destination (reference-destination setting item) of the target setting item (Step S333).

The deployment sequence determination unit 140 determines whether the reference-destination setting item is a setting item pertaining to a circular reference (Step S334). Herein, when the reference-destination setting item is a target setting item or an already traced setting item, the reference-destination setting item is determined as pertaining to a circular reference.

When the reference-destination setting item is a setting item pertaining to a circular reference at Step S334 (Step S334/Y), the deployment sequence determination unit 140 ends the entire processing as an error.

When the reference-destination setting item is not a setting item pertaining to a circular reference at Step S334 (Step S334/N), the deployment sequence determination unit 140 determines whether a condition "the reference-destination setting item is a dependent item and a setting value therefor is undetermined" is satisfied (whether the setting value is set to "dep( )") (Step S335).

When the condition "the reference-destination setting item is a dependent item and a setting value therefor is undetermined" is satisfied (when the setting value is set to "dep( )") at Step S335 (Step S335/Y), the setting value for the target setting item cannot be determined. Thus, the deployment sequence determination unit 140 does not update the deployment status (keeps "wait") of the target object in the deployment information 111, and ends the deployability determination processing (Step S33).

When the condition "the reference-destination setting item is not a dependent item and a setting value therefor is undetermined" is not satisfied (when the item other than "dep( )" is set to the setting value) at Step S335 (Step S335/N), the deployment sequence determination unit 140 further determines whether the reference-destination setting item is a referencing item (Step S336).

When the reference-destination setting item is a referencing item at Step S336 (Step S336/Y), the deployment sequence determination unit 140 acquires, from the setting information 121, a setting item at a reference destination (reference-destination setting item) of the reference-destination setting item (Step S337). The deployment sequence determination unit 140 then repeats the processing from Step S334 on the acquired reference-destination setting item.

When the reference-destination setting item is not a referencing item at Step S332 or S336 (Step S332/N or S336/N), the deployment sequence determination unit 140 determines whether all the setting items of the target object have been processed (Step S338).

When an unprocessed setting item is present (Step S338/N), the deployment sequence determination unit 140 repeats the processing from Step S331.

When all the setting items have been processed (Step S338/Y), setting values for all setting items included in the target object other than a dependent item can be determined. Thus, in this case, the deployment sequence determination unit 140 updates the deployment status of the target object in the deployment information 111 to "ready" (Step S339), and ends the deployability determination processing (Step S33).

The deployment sequence determination unit 140 repeats Step S33 on all the objects extracted at Step S31 (Step S34).

For example, the deployment sequence determination unit 140 extracts the objects "P", "Q" from the deployment information 111 (state (1a)) in FIG. 9.

In the setting information 121 (state (2a)) in FIG. 9, the setting item "b" of the object "P" is a referencing item, and the reference-destination setting item "x" is a dependent item and a setting value therefor is undetermined. Thus, the deployment sequence determination unit 140 keeps "wait" for the deployment status of the object "P", as in the deployment information 111 (state (1b)) in FIG. 9. In addition, the setting items of the object "Q" include no referencing item. Thus, the deployment sequence determination unit 140 updates the deployment status of the object "Q" to "ready", as in the deployment information 111 (state (1b)) in FIG. 9.

Next, the deployment execution unit 150 transmits, to the execution environment 300, a deployment request for objects with a deployment status of "ready" (deployment objects) in the deployment information 111 (Step S4). The deployment request herein includes an identifier of the deployment object and setting values for respective setting items of the deployment object other than a dependent item. When the setting item is a referencing item, a setting value for a reference-destination setting item is designated as a setting value for the setting item.

For example, the deployment execution unit 150 transmits, to the execution environment 300 "E1", a deployment request which includes an identifier "Q" of the object and setting values for respective setting items "y:Vy", "z:Vz" in the setting information 121 (state (2a)) in FIG. 9.

The management device 310 of the execution environment 300 deploys the deployment object on the computer 320 (Step S5). The management device 310 herein applies the setting values designated in the deployment request to respective setting items, other than a dependent item, of the deployment object. In addition, the management device 310 determines a setting value for a setting item which is a dependent item of the deployment object, and applies the setting value. The management device 310 then generates information indicating a result of the deployment (deployment result information). The deployment result information herein includes a result of the deployment (normal/failed) of each of the deployment objects and a setting value determined for a setting item which is a dependent item.

For example, the management device 310 of the execution environment 300 "E1" deploys the object "Q" on the computer 320, as in the execution environment 300 (state (3a)) in FIG. 9. The management device 310 herein applies the setting values designated in the deployment request to setting items "y", "z" of the object "Q". In addition, the management device 310 determines a setting value for the setting item "x" of the object "Q" to "Vx_E1", and applies the setting value. The management device 310 generates deployment result information including the setting value "Vx_E1" for the setting item "x".

Next, the control information update unit 160 executes control information update processing (Step S6).

Figure 8:
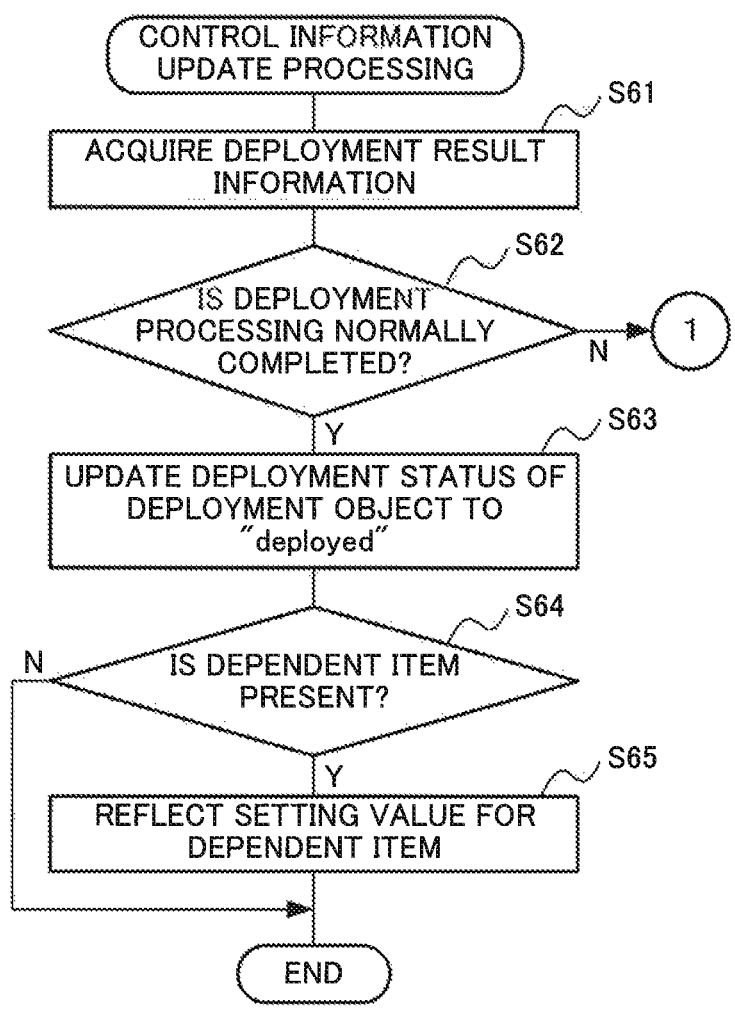
FIG. 8 is a flowchart illustrating a detail of control information update processing (Step S6) according to the first exemplary embodiment of the present invention.

FIG. 8 is a flowchart illustrating a detail of the control information update processing (Step S6) according to the first exemplary embodiment of the present invention.

The control information update unit 160 acquires the deployment result information from the execution environment 300 (Step S61).

The control information update unit 160 determines whether the deployment for all the deployment objects has been normally completed, based on the deployment result information (Step S62).

When a deployment object for which the deployment has not been normally completed is present at Step S62 (Step S62/N), the control information update unit 160 ends the entire processing as an error.

When the deployment for all the deployment objects has been normally completed at Step S62 (Step S62/Y), the control information update unit 160 updates a deployment status of each of the deployment objects in the deployment information 111 to "deployed" (Step S63).

The control information update unit 160 refers to the setting information 121, and determines whether the setting items of each of the deployment objects include a setting item which is a dependent item (Step S64).

When a setting item which is a dependent item is present at Step S64 (Step S64/Y), the control information update unit 160 acquires, from the deployment result information, the setting value of the setting item determined during the deployment, and reflects the setting value to the setting information 121 (Step S65). The control information update unit 160 ends the control information update processing (Step S6).

When no setting item which is a dependent item is present at Step S64 (Step S64/N), the control information update unit 160 ends the control information update processing (Step S6).

For example, the control information update unit 160 updates the deployment status of the object "Q" to "deployed", as in the deployment information 111 (state (1c)) in FIG. 9. The control information update unit 160 sets "Vx_E1" to the setting value for the setting item "x" which is a dependent item of the object "Q", as in the setting information 121 (state (2b)) in FIG. 9.

Next, the deployment sequence determination unit 140 determines whether an object with a deployment status of "wait" is present in the deployment information 111 (Step S7).

When an object with a deployment status of "wait" is present at Step S7 (Step S7/Y), the processing from Step S3 is executed.

For example, the deployment sequence determination unit 140 extracts the object "P" from the deployment information 111 (state (1c)) in FIG. 9.

In the setting information 121 (state (2b)) in FIG. 9, the setting item "b" of the object "P" is a referencing item, and the setting value for the reference-destination setting item "x" has been determined to "Vx_E1". Thus, the deployment sequence determination unit 140 updates the deployment status of the object "P" to "ready", as in the deployment information 111 (state (1d)) in FIG. 9.

The deployment execution unit 150 transmits, to the execution environment 300 "E1", a deployment request which includes an identifier "P" of the object and setting values for respective setting items "a:Va", "b:Vx_E1", "c:Vc" in the setting information 121 (state (2b)) in FIG. 9.

The management device 310 of the execution environment 300 "E1" deploys the object "P" on the computer 320, as in the execution environment 300 (state (3d)) in FIG. 9. The management device 310 herein applies the setting values designated in the deployment request to setting items "a", "b", "c" of the object "P".

The control information update unit 160 updates the deployment status of the object "P" to "deployed", as in the deployment information 111 (state (1e)) in FIG. 9.

When no object with a deployment status of "wait" is present at Step S7 (Step S7/N), all the objects in the setting information 121 have been deployed, and hence, the entire processing is ended.

The operation of the deployment system according to the first exemplary embodiment of the present invention is thus completed.

Figure 1:
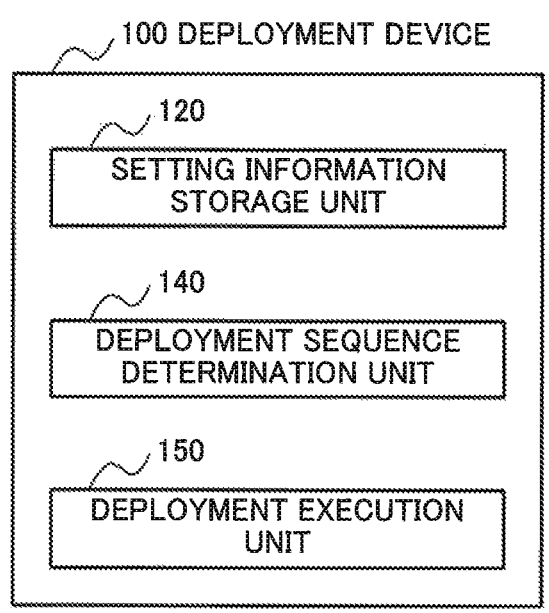
FIG. 1 is a block diagram illustrating a characteristic configuration according to a first exemplary embodiment of the present invention.

Next, a characteristic configuration of the first exemplary embodiment of the present invention will be described. FIG. 1 is a block diagram illustrating a characteristic configuration according to the first exemplary embodiment of the present invention.

Referring to FIG. 1, a deployment device 100 (information processing device) includes a setting information storage unit 120, a deployment sequence determination unit 140, and a deployment execution unit 150.

The setting information storage unit 120 stores setting information 121 indicating a referencing relation among setting items of a plurality of objects included in a system and a dependent item which is a setting item whose value is determined during deployment in an execution environment 300 among the setting items of the plurality of objects. The deployment sequence determination unit 140 determines a sequence in which the plurality of objects are to be deployed in the execution environment 300, based on the setting information 121. The deployment execution unit 150 deploys each of the plurality of objects in the execution environment 300 in accordance with the deployment sequence.

The first exemplary embodiment of the present invention enables efficient system construction even when components (objects) of a system include such a setting item whose setting value is determined by an environment of a destination of construction during deployment. The reason is that the deployment sequence determination unit 140 determines a sequence in which a plurality of objects are to be deployed in an execution environment 300, based on setting information 121 indicating a referencing relation among setting items of the plurality of objects included in a system and a dependent item on the execution environment 300.

Second Exemplary Embodiment

Next, a second exemplary embodiment of the present invention will be described.

The second exemplary embodiment of the present invention is different from the first exemplary embodiment of the present invention in that a system is constructed by using setting values for setting items which are input from a user and are not associated (not grouped) with an object.

Figure 10:
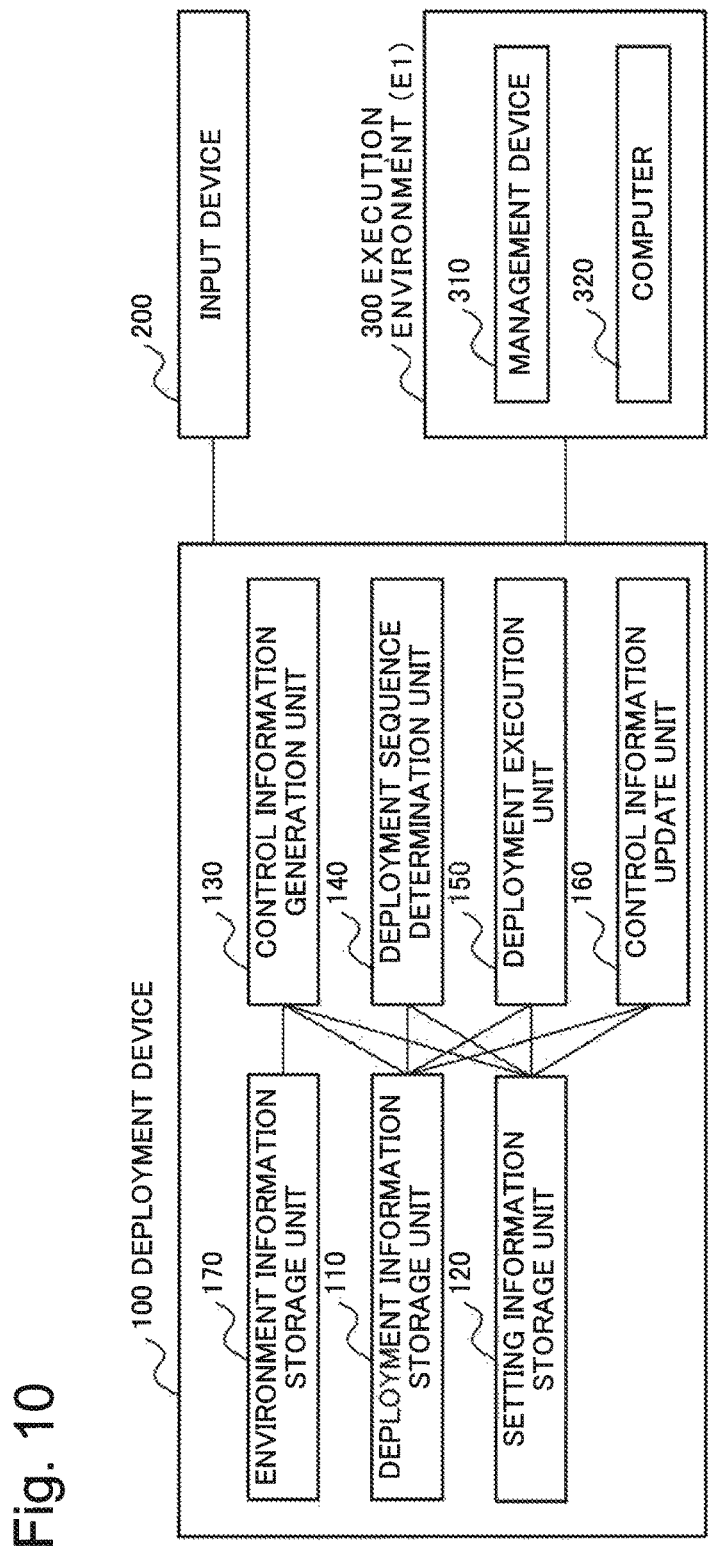
FIG. 10 is a block diagram illustrating a configuration of a deployment system according to a second exemplary embodiment of the present invention.

First, a configuration according to the second exemplary embodiment of the present invention will be described. FIG. 10 is a block diagram illustrating a configuration of a deployment system according to the second exemplary embodiment of the present invention.

A deployment device 100 according to the second exemplary embodiment of the present invention includes, in addition to the configuration of the deployment device 100 according to the first exemplary embodiment of the present invention, an environment information storage unit 170.

The environment information storage unit 170 stores environment information 171. The environment information 171 indicates objects deployable in an execution environment 300 and setting items of the objects.

Figure 12:
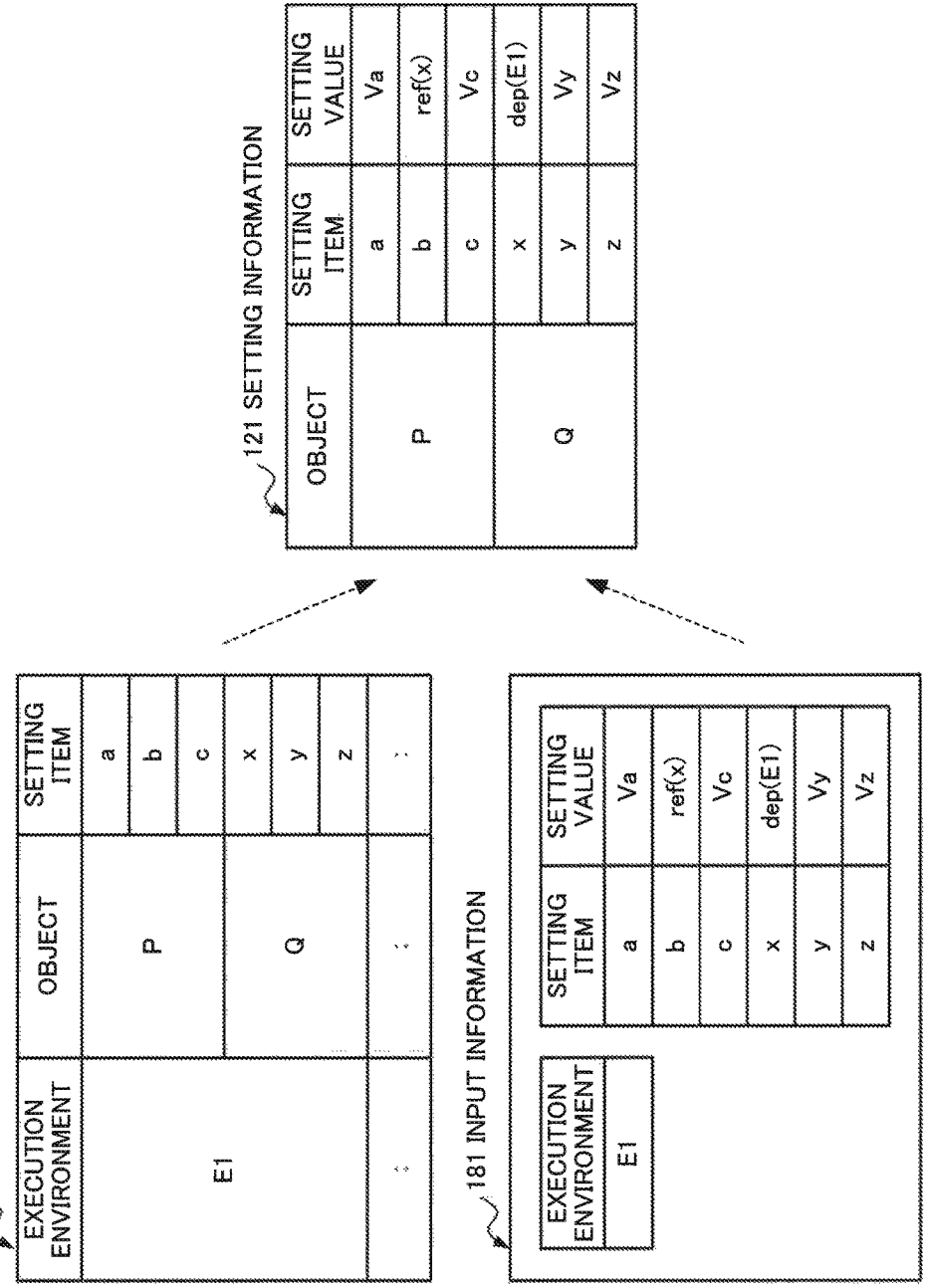
FIG. 12 is a diagram illustrating an example of environment information 171, input information 181, and setting information 121 according to the second exemplary embodiment of the present invention.

FIG. 12 is a diagram illustrating an example of the environment information 171, input information 181, and setting information 121 according to the second exemplary embodiment of the present invention.

In the example in FIG. 12, the environment information 171 includes, for each identifier of the execution environment 300, identifiers of objects deployable in the execution environment 300 and identifiers of setting items of the objects. The environment information 171 in FIG. 12 indicates that objects "P" and "Q" are deployable in the execution environment 300 "E1", and that the object "P" includes setting items "a", "b", "c" and the object "Q" includes setting items "x", "y", "z".

The environment information 171 is set by a user or the like in advance.

In addition, in the second exemplary embodiment of the present invention, a user inputs the input information 181 as a system construction request. The input information 181 indicates the execution environment 300 being a destination of the system construction, and setting values for setting items which are not associated (not grouped) with an object.

In the example in FIG. 12, the input information 181 includes an identifier of the execution environment 300 being a destination of the system construction, and setting values for respective setting items. In the input information 181 in FIG. 12, setting values for setting items "a", "b", "c", "x", "y", and "z" are designated for the execution environment 300 "E1" being a destination of the system construction.

The control information generation unit 130 generates, based on the environment information 171 and the input information 181, the setting information 121 in accordance with the execution environment 300 being a destination of the system construction.

Next, the operation of the deployment system according to the second exemplary embodiment of the present invention will be described.

Figure 11:
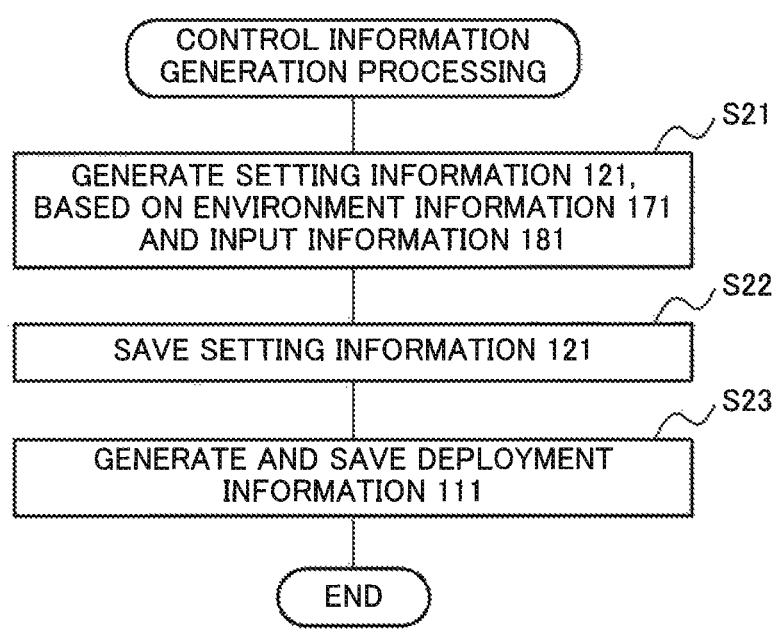
FIG. 11 is a flowchart illustrating a detail of control information generation processing (Step S2) according to the second exemplary embodiment of the present invention.

FIG. 11 is a flowchart illustrating a detail of control information generation processing (Step S2) according to the second exemplary embodiment of the present invention.

The control information generation unit 130 generates, based on the environment information 171 and the input information 181, the setting information 121 (Step S21). The control information generation unit 130 herein acquires, from the input information 181, the execution environment 300 being a destination of the system construction. The control information generation unit 130 then acquires, from the environment information 171, objects deployable in the acquired execution environment 300 and setting items of each of the objects. The control information generation unit 130 generates the setting information 121 by associating (grouping) the setting values for respective setting items indicated in the input information 181 with the object including the setting items.

For example, the control information generation unit 130 generates, based on the environment information 171 and the input information 181, the setting information 121, as in FIG. 12.

Hereinafter, the control information generation unit 130 saves the setting information 121 in the setting information storage unit 120 (Step S22), generates deployment information 111 and saves the deployment information 111 in the deployment information storage unit 110 (Step S23), in the same way as the first exemplary embodiment of the present invention.

The operation of the deployment system according to the second exemplary embodiment of the present invention is thus completed.

The second exemplary embodiment of the present invention enables efficient system construction in the same way as the first exemplary embodiment, without designating an object corresponding to setting items (without grouping setting values) by a user. The reason is that the control information generation unit 130 generates the setting information 121 by associating (grouping) input setting values with an object, based on the environment information 171. This makes it possible to readily construct a system even when an object setting a certain setting item differs depending on the execution environment 300.

Third Exemplary Embodiment

Next, a third exemplary embodiment of the present invention will be described.

The third exemplary embodiment of the present invention is different from the second exemplary embodiment of the present invention in that a system is constructed by using a plurality of execution environments 300.

Figure 13:
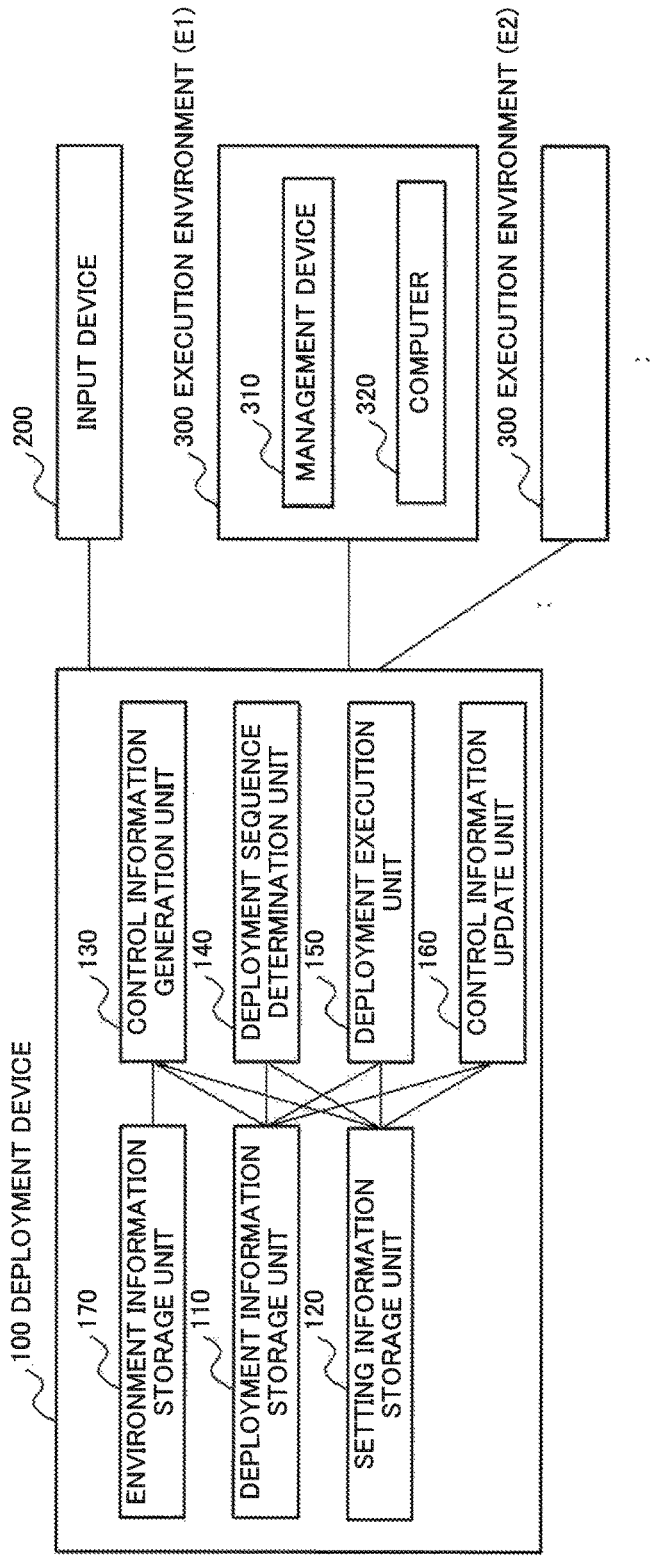
FIG. 13 is a block diagram illustrating a configuration of a deployment system according to a third exemplary embodiment of the present invention.

First, a configuration according to the third exemplary embodiment of the present invention will be described. FIG. 13 is a block diagram illustrating a configuration of a deployment system according to the third exemplary embodiment of the present invention.

Referring to FIG. 13, the deployment system according to the third exemplary embodiment of the present invention includes, in addition to the deployment device 100 and the input device 200, a plurality of execution environments 300 "E1", "E2", . . . .

A system to be constructed by using the plurality of execution environments 300 herein refers to, for example, a system which includes a Web server deployed on a public cloud and a batch server deployed on a private cloud.

Figure 14:
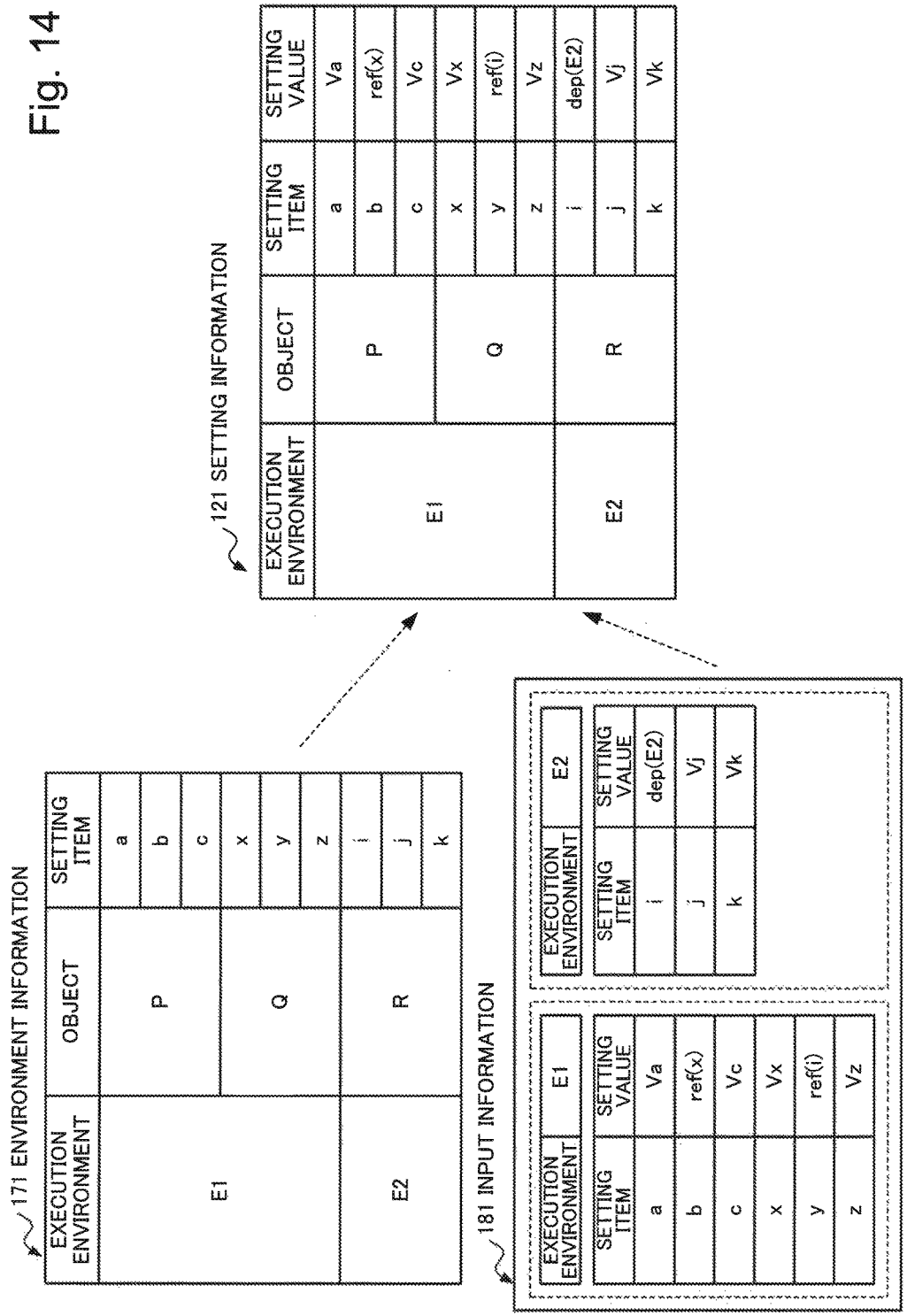
FIG. 14 is a diagram illustrating an example of environment information 171, input information 181, and setting information 121 according to the third exemplary embodiment of the present invention.

FIG. 14 is a diagram illustrating an example of environment information 171, input information 181, and setting information 121 according to the third exemplary embodiment of the present invention. In the environment information 171 in FIG. 14, deployable objects and setting items of the objects are indicated for each of the execution environments 300 "E1", "E2". In addition, in the input information 181 in FIG. 14, setting values for setting items are designated for each of the execution environments 300 "E1", "E2" for use in the system construction. In the setting information 121 in FIG. 14, setting items and setting values of objects to be deployed in the execution environments 300 are indicated for each of the execution environments 300 "E1", "E2" for use in the system construction.

Next, the operation of the deployment system according to the third exemplary embodiment of the present invention will be described.

Herein, it is assumed that the environment information 171 as in FIG. 14 is stored in the environment information storage unit 170 and that the input information 181 as in FIG. 14 is input from the input device 200.

The control information generation unit 130 generates, based on the environment information 171 and the input information 181, the setting information 121, as in FIG. 14.

Figure 15:
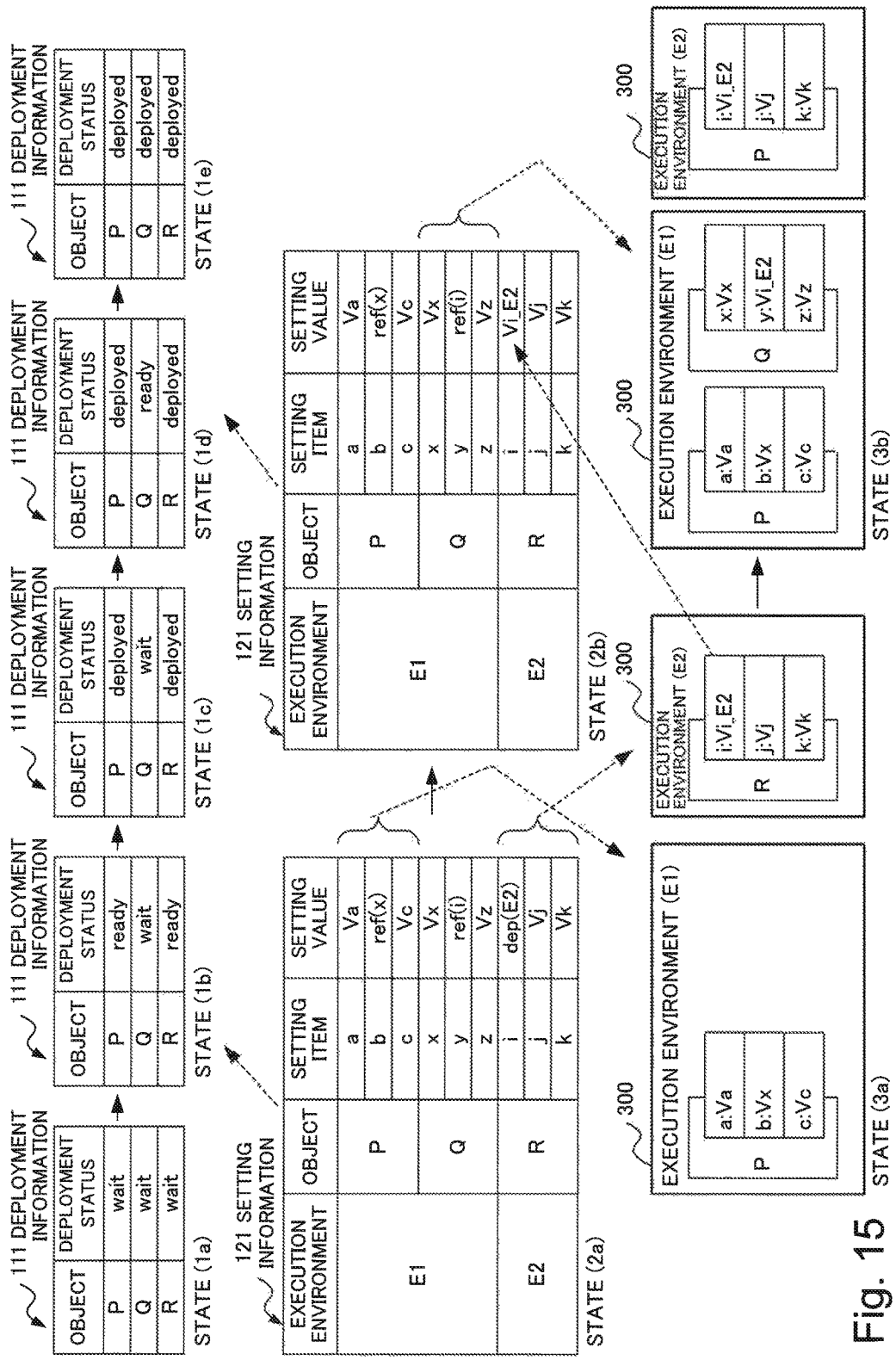
FIG. 15 is a diagram illustrating an example of states of deployment information 111, setting information 121, and execution environments 300 according to the third exemplary embodiment of the present invention.

FIG. 15 is a diagram illustrating an example of states of deployment information 111, the setting information 121, and the execution environments 300 according to the third exemplary embodiment of the present invention.

In the setting information 121 (state (2a)) in FIG. 15, a setting item "y" of an object "Q" is a referencing item, and a reference-destination setting item "i" is a dependent item and a setting value therefor is undetermined. Thus, the deployment sequence determination unit 140 keeps "wait" for the deployment status of the object "Q", as in the deployment information 111 (state (1b)) in FIG. 15, and updates the deployment statuses of objects "P", "R" to "ready".

The deployment execution unit 150 transmits, to the execution environment 300 "E1" being a destination of the deployment of the object "P", a deployment request which includes an identifier "P" of the object and setting values for respective setting items of the object "P" in the setting information 121 (state (2a)) in FIG. 15. In addition, the deployment execution unit 150 transmits, to the execution environment 300 "E2" being a destination of the deployment of the object "R", a deployment request which includes an identifier "R" of the object and setting values for respective setting items of the object "R".

The management devices 310 of the execution environments 300 "E1", "E2" respectively deploy the objects "P", "R", as in the execution environments 300 (state (3a)) in FIG. 15. The management device 310 of the execution environment 300 "E2" herein determines a setting value "Vi_E2" for the setting item "i".

The control information update unit 160 updates the deployment statuses of the objects "P", "R" to "deployed", as in the deployment information 111 (state (1c)) in FIG. 15. The control information update unit 160 sets "Vi_E2" to the setting value for the setting item "i" which is a dependent item of the object "R", as in the setting information 121 (state (2b)) in FIG. 15.

In the setting information 121 (state (2b)) in FIG. 15, the setting item "y" of the object "Q" is a referencing item, and the setting value for the reference-destination setting item "i" has been determined to "Vi_E2". Thus, the deployment sequence determination unit 140 updates the deployment status of the object "Q" to "ready", as in the deployment information 111 (state (1d)) in FIG. 15.

The deployment execution unit 150 transmits, to the execution environment 300 "E1" being a destination of the deployment of the object "Q", a deployment request which includes an identifier "Q" of the object and setting values for respective setting items of the object "Q" in the setting information 121 (state (2b)) in FIG. 15.

The management device 310 of the execution environment 300 "E1" deploys the object "Q", as in the execution environment 300 (state (3b)) in FIG. 15.

The control information update unit 160 updates the deployment status of the object "Q" to "deployed", as in the deployment information 111 (state (1e)) in FIG. 15.

The operation of the deployment system according to the third exemplary embodiment of the present invention is thus completed.

The third exemplary embodiment of the present invention enables efficient system construction in the same way as the first and second exemplary embodiments of the present invention, even when a system is constructed by using a plurality of execution environments 300. The reason is that the deployment execution unit 150 requests for, when requesting for deployment of objects in accordance with a determined deployment sequence, deployment in an execution environment 300 among a plurality of execution environments 300 being a destination of deployment of the objects.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2014-124444, filed on Jun. 17, 2014, the disclosure of which is incorporated herein in its entirety by reference.

REFERENCE SIGNS LIST

100 Deployment device
101 CPU
102 Storage means
103 Communication means
104 Input means
105 Output means
110 Deployment information storage unit
111 Deployment information
120 Setting information storage unit
121 Setting information
130 Control information generation unit
140 Deployment sequence determination unit
150 Deployment execution unit
160 Control information update unit
170 Environment information storage unit
171 Environment information
181 Input information
200 Input device
300 Execution environment
310 Management device
320 Computer

What is claimed is:

1. An information processing device comprising:
setting information storage unit that stores setting information indicating a referencing relation among setting items of a plurality of objects included in a system and a dependent item which is a setting item whose value is determined during deployment in an execution environment among the setting items of the plurality of objects, deployment sequence determination unit that determines a sequence in which the plurality of objects are to be deployed in the execution environment, based on the setting information, wherein the deployment sequence determination unit ends the entire processing as an error when the deployment sequence determination unit determines that a setting item at a reference destination of a target setting item of one object is pertaining to a circular reference; and deployment execution unit that deploys each of the plurality of objects in the execution environment in accordance with the deployment sequence, wherein the deployment execution unit deploys, when a setting item of one object among the plurality of objects refers to a dependent item of another object, the one object in the execution environment by using a value for the dependent item of the another object determined by the execution environment.

2. The information processing device according to claim 1, wherein the deployment sequence determination unit determines, when a setting item of one object among the plurality of objects refers to a dependent item of another object, the deployment sequence in such a way that the one object is to be deployed in the execution environment later than the another object.

3. The information processing device according to claim 1, wherein the setting information indicates, as information relating to a setting item of each of the plurality of objects, any of a value for the setting item, a setting item of another object referred to by the setting item, and a feature that the setting item is the dependent item, and the deployment execution unit deploys, when deploying one object among the plurality of objects, the one object in the execution environment by using a value for a setting item of the one object or a value for a setting item of another object referred to by a setting item of the one object, in the setting information.

4. The information processing device according to claim 3, further comprising: environment information storage unit that stores environment information indicating a setting item of each of the plurality of objects; and setting information generation unit that generates the setting information by associating, based on the environment information, each of pieces of information relating to one or more input setting items with any of the plurality of objects.

5. The information processing device according to claim 1, wherein the deployment execution unit deploys each of the plurality of objects in any of a plurality of the execution environments being a destination of deployment of the object, in accordance with the deployment sequence.

6. A deployment method comprising:

determining, based on setting information indicating a referencing relation among setting items of a plurality of objects included in a system and a dependent item which is a setting item whose value is determined during deployment in an execution environment among the setting items of the plurality of objects, a sequence in which the plurality of objects are to be deployed in the execution environment, wherein the entire processing ends with an error when a setting item at a reference destination of a target setting item of one object is determined to be pertaining to a circular reference; and deploying each of the plurality of objects in the execution environment in accordance with the deployment sequence, wherein one object in the execution environment is deployed by using a value for the dependent item of the another object determined by the execution environment when a setting item of the one object among the plurality of objects refers to a dependent item of another object.

7. The deployment method according to claim 6, wherein, in the determining, when a setting item of one object among the plurality of objects refers to a dependent item of another object, the deployment sequence is determined in such a way that the one object is to be deployed in the execution environment later than the another object.

8. A non-transitory computer readable storage medium recording thereon a program, causing a computer to perform a method comprising:

determining, based on setting information indicating a referencing relation among setting items of a plurality of objects included in a system and a dependent item which is a setting item whose value is determined during deployment in an execution environment among the setting items of the plurality of objects, a sequence in which the plurality of objects are to be deployed in the execution environment, wherein the entire processing ends with an error when a setting item at a reference destination of a target setting item of one object is determined to be pertaining to a circular reference; and deploying each of the plurality of objects in the execution environment in accordance with the deployment sequence, wherein one object in the execution environment is deployed by using a value for the dependent item of the another object determined by the execution environment when a setting item of the one object among the plurality of objects refers to a dependent item of another object.

9. The non-transitory computer readable storage medium recording thereon the program according to claim 8, wherein, in the determining, when a setting item of one object among the plurality of objects refers to a dependent item of another object, the deployment sequence is determined in such a way that the one object is to be deployed in the execution environment later than the another object.

* * * * *